March 3, 1970     T. GARBER ET AL     3,498,114
TRANSDUCER FOR MEASURING FORCE AND DISPLACEMENT
Filed April 11, 1968     2 Sheets-Sheet 1

INVENTORS
Thomas Garber
William L. Kelleher
BY Mortenson and Weigel
ATTORNEYS

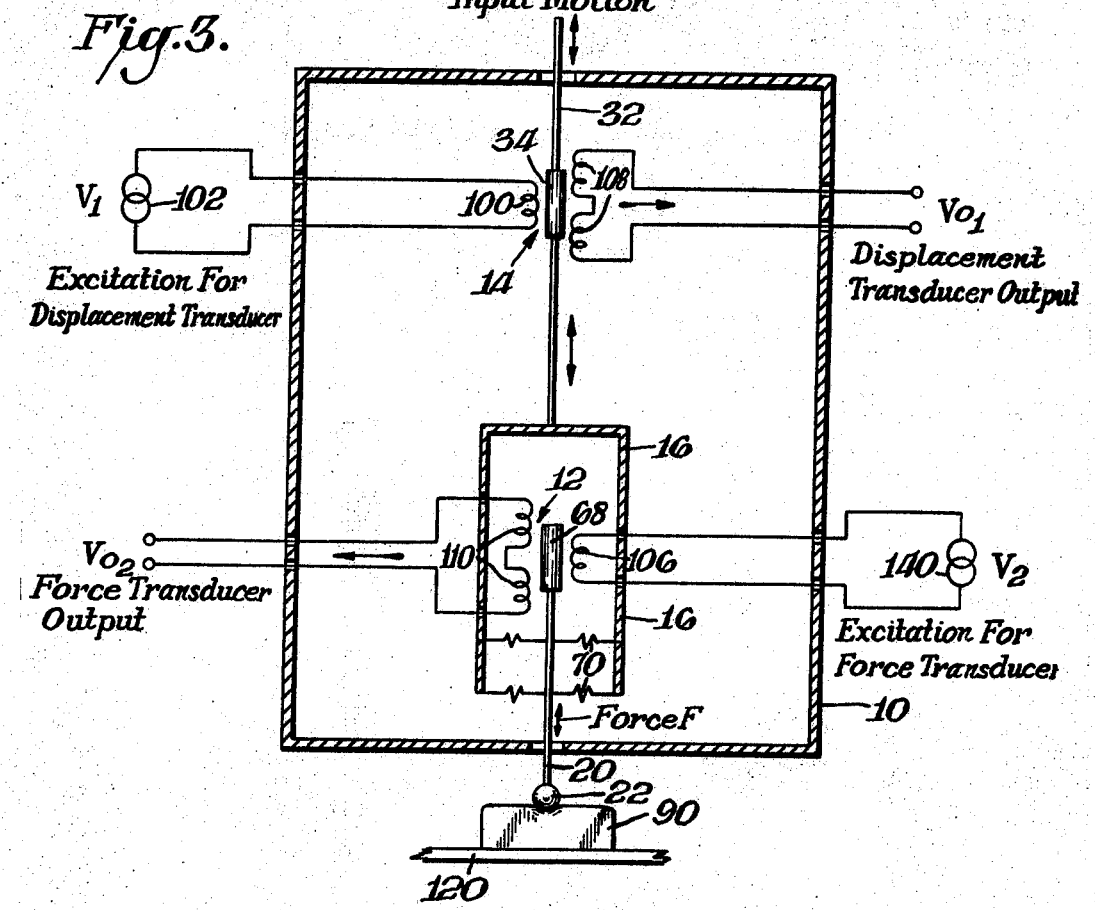

United States Patent Office 3,498,114
Patented Mar. 3, 1970

3,498,114
TRANSDUCER FOR MEASURING FORCE
AND DISPLACEMENT
Thomas Garber, Framingham, and William L. Kelleher,
Newburyport, Mass., assignors to Hewlett-Packard
Company, Palo Alto, Calif., a corporation of California
Filed Apr. 11, 1968, Ser. No. 720,689
Int. Cl. G01n 29/00
U.S. Cl. 73—67.2                                      7 Claims

ABSTRACT OF THE DISCLOSURE

A transducer is constructed to include both a force sensor and a displacement or velocity sensor. The force sensor is free to move longitudinally on bearings inside the transducer and is coupled to receive a mechanical input signal through the input element of the displacement or velocity sensor. The displacement or velocity sensor is coaxially aligned with the force sensor and is secured fixedly within the transducer. The input element of the force sensor is spring biased to the force sensor. The output signals from the respective sensors may be operated on or combined mathematically to obtain, for example, work performed on an object.

---

This invention relates to a plural variable transducer and, more particularly, to an integral transducer which is capable of simultaneously measuring two related variables relatively accurately.

Background of the invention

There are presently available many different types of separate force sensors and displacement or velocity sensors. It is often necessary and/or desirable, however, to use these separate sensors simultaneously and with respect to the same object in order to measure various parameters of the object. For example, it may be desirable to make simultaneous force and displacement measurements of muscle tissue and determine the muscle characteristics when the muscle is in various fluids. In another application, a transducer may be used to measure the effective hardness of an object with a special contact tip. The object may be a rubber-like material or a fruit such as canteloupe. In the latter instance, the penetration for a given force would be a measure of the canteloupe's ripeness.

It is not easy to make these measurements simultaneously using separate sensors. Many problems are encountered. For one thing it is difficult to couple the sensors together so that they can both act simultaneously on the same object. If the sensors are not aligned accurately, for example, may measurement errors may occur. In addition there are problems encountered because of backlash in the mechanical coupling, friction, compliance, and temperature effects to name but a few.

It is, therefore, an object of this invention to simultaneously measure plural related motion variables of an object in a simple accurate and direct manner.

Another object of this invention is to provide an improved force-displacement transducer which occupies a relatively small volume.

Still another object of this invention is to provide an improved force-displacement transducer.

Brief description of the invention

In a preferred embodiment of the invention the transducer includes both force and displacement sensors positioned within a cylindrical body. Extending from one end of the cylindrical body is a contact rod which is coupled to the input of the force transducer and which is brought into contact with the object to be measured. The object is held with respect to the body of the transducer. Extending from the other end of the transducer body is a second rod to which an input motion is coupled. Separate wires extending from the transducer body provide the respective electrical signals corresponding to force and displacement.

The force and displacement sensors each use a differential transformer as a basic means of sensing the physical input variables. A typical differential transformer consists of a cylindrical coil assembly having a suitable bore so that a cylindrical ferromagnetical armature is free to be positioned coaxially within the coil assembly. The relative displacement of the core with respect to the coil assembly in this axial direction results in an electrical output signal, in the case of the displacement sensor, directly related to armature displacement. The differential transformer by itself is a displacement sensor.

In the case of the force sensor, the force acting on the contact member of the transducer with respect to the force sensor body causes the deflection of springs which couple the contact rod to the force sensor body. This results in a relative displacement of the force sensor armature with respect to its coil assembly which is proportional to the force which produced it. The force sensor body is mounted on bearings within the transducer so that it is free to move axially within the transducer. In turn, the force sensor body is coupled to the armature of the displacement sensor and, hence, to the input motion applied to the object under measure.

Brief description of the drawings

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 3 is a schematic drawing of the force-displacement transducer of FIGS. 1 and 2.

Description of the preferred embodiment

Figure 1:
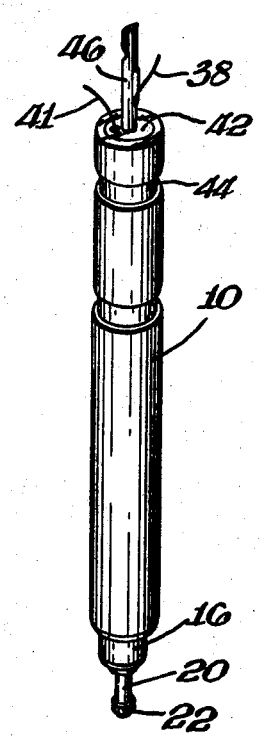
FIGURE 1 is a pictorial view of a force-displacement transducer, constructed in accordance with this invention shown in its operating position.
Figure 2:
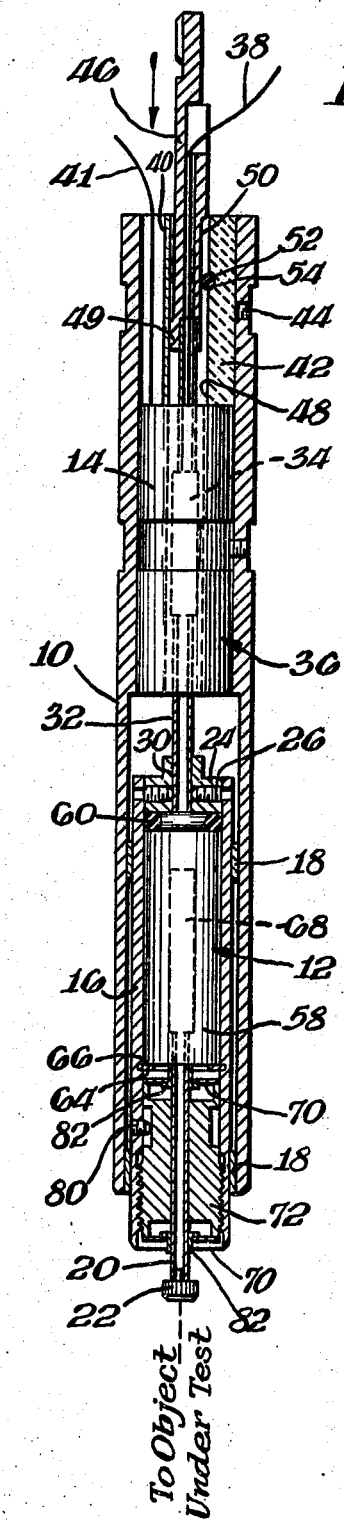
FIGURE 2 is a cross-sectional view of the force-displacement transducer illustrated in FIG. 1.

In the drawings of FIGS. 1 and 2 there is seen a force-displacement transducer constructed in accordance with this invention. The transducer includes a first tubular housing 10 which encloses a force sensor 12 and a displacement sensor 14. The force sensor 12 is enclosed within a second tubular housing 16 mounted by bearings 18 to move axially within the first transducer housing 10. Mechanical coupling to the object under test may be had through a tubular contact rod 20 having an end cap 22. The end cap has a pin which is fitted into the free end of the contact rod 20. The force sensor housing 16 has an end member 24, in one end opposite to the end having the contact rod 20. The end member 24 is held in position within the force sensor housing 16 by means of set screws 26.

The force sensor 12 receives input motion, which is applied to the object under test, through a tubular rod rod 32 which is fitted in an axial bore 30 within the end guide 24. If desired, the set screw 26 may engage the tubular rod 32. The tubular rod 32 preferably is of a hollow non-magnetic material so as not to affect the displacement sensor 14. Fixedly mounted coaxially on the rod 32 is a hollow cylindrical magnetic armature 34 for the displacement sensor. The armature 34 is adapted to move axially through the displacement sensor 14. The displacement sensor in its simplest form may comprise a differential transformer indicated generally at 36 and is usually understood to consist of a primary winding, the movable armature 34, and a pair of secondary windings, connected in opposition, to provide an output signal. The combined input and output windings 36 of the displacement sensor are coupled to the exterior of the transducer housing 10 through a bore 40 formed in an end sleeve 42 inserted into the righthand (in the drawing) end of the transducer housing and secured as by means of a set screw 44.

In turn the tubular rod 32 is positioned in a counterbore in an input motion sleeve 46 which is hollow and adapted to move axially through the transducer within a central bore 48 formed in the end sleeve 42. The input motion sleeve 46 has a flat portion 50 on its periphery which is adapted to receive a cylindrical pin guide 52 positioned in a half-cylindrical detent 54 in the bore 48 to prevent rotation of the input motion sleeve. The input motion sleeve 46 is generally of lesser diameter than the bore 48 except at the lefthand (in the drawing) end portion 49 thereof which is of full diameter so as to slide within the bore 48. The input motion sleeve 46 is supported by this end portion 49 in combination with the cylindrical guide 52. Part of the input motion sleeve 46 is hollow so as to permit the wires 38 from the force sensor 12 to extend outside of the transducer housing 10. These wires 38 extend through the input motion sleeve 46 and through the tubular rod 32, which imparts motion from the input motion sleeve 46 to the force sensor housing 16, to the windings 58 of the force sensor.

The coil assembly 58 in the force sensor is hollow and cylindrical in shape so as to permit insertion into the cavity of the tubular force sensor housing 16. It is supported at one end by a rubber grommet 60 positioned between the coil assembly 58 and the end guide 30. At the other end, the coil assembly 58 is supported by a C ring retainer 66 inserted into an internal annular groove 64 on the interior of the force sensor housing 16. The armature 68 of the force sensor is adapted to slide axially within the coil assembly 58 in conventional manner and is connected to be driven by the contact rod 20 which is formed of a non-magnetic material. The contact rod 20 is linked to the force sensor housing 16 by means of disc springs 70 which are appropriately welded to either end of a guide sleeve 72 inserted in the exterior end of the force sensor housing 16. Both ends of the guide sleeve 72 are slightly recessed or counter bored so as to permit axial flexure of the disc springs 70. The depth of the recess limits the axial motion permitted the contact rod 20 and thereby limits the flexure of the disc springs 70 thereby preventing damage to the springs.

The guide sleeve 72 is threaded into and retained within the force sensor housing 16 by a set screw 80. The disc springs 70 are mechanically coupled to the contact rod 20 by means of tubular sleeves 82 which are welded both to the inner hole of the doughnut shaped disc spring 70 and to the exterior or the contact rod 20. Hence, the inputs (armatures) 68 and 34 of the force sensor 12 and the displacement sensor 14, respectively, are mechanically responsive to the respective variables, force and displacement which are to be measured.

Sometimes differential transformers are used in conjunction with phase sensitive devices, through a range on both sides of the null position of the armature within the differentially connected windings of the coil assemblies 58 and 36, respectively. In the present apparatus it may be assumed that the useful movement of the core is on both sides of the zero or null so that the amplitude of the respective output signals is utilized with reference to a 180° phase change through the zero position. Unilateral motion with respect to the null position may be used if desired.

It is further to be understood that although differential transformers are shown, other types of sensing devices may be employed as desired. For example, in place of the differential transformer sensors, capacitive sensors could be employed to measure the respective displacements of the contact rod 20 and the tubular rod 32. Also, the materials used to construct the transducer, except to the extent already specified, are generally unimportant. Typically, the housings, inserts, etc., are constructed of stainless steel. The non-magnetic materials selected also are unimportant and may be, for example, brass.

In its operation the transducer 10 is placed such that only the contact tip 22 is against or in contact with the object under test. Stated in another manner, the transducer housing 10 is held with respect to the object under test with only the tip 22 in contact with the object. A mechanical input motion such as that imparted by a hammer or other means is imparted to the input motion sleeve 46. This motion is transmitted axially through the transducer housing 10 by means of the tubular rod 32 to the force sensor housing 16. The resulting motion of the armature 34 with respect to the coil assemblies 36 of the differential transformer comprising the displacement sensor 14 determines the output signal of the displacement sensor. Since the motion of the armature 34 is directly coupled to the force sensor housing or body and not directly to the object under test, the output signal of the displacement sensor is not precisely the signal corresponding to the resulting displacement of the object under test. The force sensor housing 16 is free to slide in the bearings 18 and transmit the mechanical input signal or motion to the object under test through the disc springs 70 and contact rod 20. Whatever axial motion is permitted by the flexure of the disc springs 70, is sensed by the resulting displacement of the armature 68 of the force sensor differential transformer 58 with respect to the force sensor housing 16.

The error occurring in the reading of the displacement sensor 14 is the displacement of this force sensor armature 68 with respect to the force sensor windings 58 which is proportional to the force sensor signal output. This error may be corrected by combining the force sensor output signal appearing on the output wires 38 with that of the displacement sensor appearing on the wires 41.

Depending upon the spring rate of the disc spring 70, the output of the force transducer multiplied by a factor proportional to the spring rate is added to the output signal of the displacement transducer, thereby to provide an output signal from the displacement transducer 14 which is directly proportional to the resulting axial displacement of the object as a result of the mechanical input signal applied to the input motion sleeve 46. There is little error in the output signal derived from the force sensor 12. The amount of force applied to the object under test is directly related to the spring rate of the disc springs 70. The lower the spring rate for a given mechanical input signal, the lower will be the force transmitted to the object under test, or conversely the greater will be the displacement of the force sensor armature 68 relative to the windings 58. In any event, force is measured.

The output signals from the respective force and displacement transducers 12 and 14 may be coupled to a conventional X-Y recorder in which the displacement is recorded against the force. This provides a record which can be operated on point by point to yield a measure of work. In other applications, the force and displacement signals may be combined by various known processing equipment.

The displacement transducer described is quite compact in construction, maintains both the force transducer and displacement transducer axially located on the same axis so that few errors result from this source. Both sensors react simultaneously to the same mechanical input signal.

There is no backlash in the mechanical coupling between the sensors and the effects of friction and temperature changes are small.

In FIG. 3 there is shown a schematic layout of the transducer of FIGS. 1 and 2 in which the the transducer housing is illustrated by the cross-hatched rectangle 10. Within the housing of the transducer 10 there is enclosed the force sensor 12 and the displacement sensor 14. The force sensor 12 includes a differential transformer having a primary winding 106 and differentially connected secondary windings 110 enclosed within the housing denoted by the cross-hatched open rectangle 16. In like manner the displacement sensor 14 includes a differential transformer having a primary winding 100 and differentially connected secondary windings 108. The flux of the primary winding 100 is initially coupled to the secondary windings 108 by means of the movable armature 34. The movable armature 34 is connected to be driven by the rod 32 which is coupled to the mechanical input signal. The rod 32 continues on and is directly coupled to the force transducer housing 16 so as to move the entire housing 16 in accordance with the input signal applied to rod 32. This housing 16, in turn, is coupled by way of the disc springs illustrated schematically at 70 to the contact rod 20 which is placed in contact through the tip 22 to the object under test. The object under test is illustrated as block 90 positioned upon a suitable support 120. The contact rod 20 in turn is coupled to the movable armature 68 of the force transducer to vary the coupling between the primary winding 106 and the secondary windings 110 of the differential transformer comprising the force transducer 12.

The electrical connections of the transducer 10 include sources of alternating current 102 and 140 designated respectively by the symbol $V_1$ and $V_2$. These sources of alternating current signals are coupled with the primary windings 100 and 106, respectively, of the displacement and force sensors 14 and 16. The output $V_{01}$ of the differentially connected secondaries 108 is the displacement sensor output. The output $V_{02}$ of secondary 110 is the force sensor output. These outputs $V_{01}$ and $V_{02}$ may be further processed as desired depending upon the information needed.

In alternative embodiments, velocity sensors may be substituted for the displacement sensor 14, the remainder of the structural and electrical connections remaining the same. The time integral of the product of the force $V_{02}$ times the velocity $V_{01}$ is proportional to work performed on or received from an object subjected to input motion.

There has thus been described a relatively simple transducer which simultaneously measures force as well as displacement or velocity. The transducer is compact and uniquely couples together a force sensor and a displacement or velocity sensor in proper alignment by a coupling having relatively low mechanical backlash and friction. The transducer is economical of construction.

What is claimed is:

1. A transducer for measuring the effects of a mechanical input signal on an object comprising:
    a tubular housing having an axis,
    a first and second sensor each having a mechanical input adapted to be applied along a respective axis and an output adapted to provide an electrical output signal whose amplitude varies in accordance with the mechanical input along the axis being sensed,
    said mechanical input of said first sensor being adapted to contact said object and spring biased to permit relative movement between said first sensor and its mechanical input along said sensor axis,
    said first sensor being slidably mounted in said housing to move along said housing axis,
    said second sensor being fixedly positioned within said housing,
    the axis of each of said mechanical inputs being substantially coincident with said housing axis, and the mechanical input of said second sensor being connected to position said first sensor axially within said housing, whereby said first and second sensor are coupled to measure force and lineal motion with respect to said object.

2. A transducer according to claim 1 wherein the input of said first sensor is adapted to contact with said object and the input of said second sensor is adapted to be connected directly to said input signal, thereby to reduce frictional errors in said transducer.

3. A transducer according to claim 1 wherein said first and second sensors are displacement sensors.

4. A transducer according to claim 1 wherein said first sensor is a displacement sensor and said second sensor is a velocity sensor.

5. A transducer in accordance with claim 1 wherein each of said sensors comprises a differential transformer having a primary winding, a pair of secondary windings connected in opposition, and a core adapted to move with respect to the windings as to vary the coupling between the primary and respective secondary windings, thereby to vary the amplitude of a signal applied to said primary winding in accordance with the displacement of said core.

6. A transducer for measuring the effects of a mechanical input signal on an object comprising:
    a first tubular housing having an axis,
    first and second differential transformers each having a primary winding, a pair of secondary windings connected in opposition, and a core, said core and said secondary windings adapted to undergo relative movement to vary the coupling between the primary winding and the respective secondary windings, thereby to provide an output signal that varies in amplitude in accordance with the position of said core,
    a second tubular housing for said first transformer coaxially and slideably positioned within said first tubular housing, the core of said first transformer being spring mounted within said second housing for displacement along said axis,
    said second transformer being fixedly positioned in said first housing, the core of said second transformer being directly connected to axially displace said second housing within said first housing along said axis, and
    one of said first and second transformer cores being adapted to contact said object and the remaining one of said first and second transformer cores being adapted to be subjected to said mechanical input signal.

7. A transducer in accordance with claim 6 which also includes means for applying electrical signals to each of said primary windings.

References Cited

UNITED STATES PATENTS 2,045,474  6/1936  Kemler _____ 73—141 X
3,224,253  12/1965  McKay _____ 73—67

JERRY W. MYRACLE, Primary Examiner

U.S. Cl. X.R.

73—71.4, 82